(12) United States Patent
Weber et al.

(10) Patent No.: US 12,257,894 B2
(45) Date of Patent: Mar. 25, 2025

(54) DRIVE DEVICE FOR A VEHICLE AXLE

(71) Applicant: AUDI AG, Ingolstadt (DE)

(72) Inventors: Andreas Weber, Ingolstadt (DE); Harald Gloede, Pförring (DE); Frank Röthlingshöfer, Ingolstadt (DE); Korbinian Weber, Ingolstadt (DE); Christian Holzapfel, Lenting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/709,315

(22) PCT Filed: Dec. 6, 2022

(86) PCT No.: PCT/EP2022/084494
§ 371 (c)(1),
(2) Date: May 10, 2024

(87) PCT Pub. No.: WO2023/104755
PCT Pub. Date: Jun. 15, 2023

(65) Prior Publication Data
US 2025/0026196 A1   Jan. 23, 2025

(30) Foreign Application Priority Data
Dec. 9, 2021 (DE) .................. 10 2021 132 494.7

(51) Int. Cl.
*B60K 17/16*   (2006.01)
*B60K 1/00*   (2006.01)
(Continued)

(52) U.S. Cl.
CPC ....... *B60K 17/165* (2013.01); *F16H 37/0813* (2013.01); *F16H 57/021* (2013.01);
(Continued)

(58) Field of Classification Search
CPC ...... B60K 1/00; B60K 1/02; B60K 2001/001; B60K 17/165; B60K 5/12–1225;
(Continued)

(56) References Cited

U.S. PATENT DOCUMENTS 10,981,600 B2 * 4/2021 Yamada ................. B62D 21/11
11,692,603 B2 * 7/2023 Jomaa ................... F16F 1/3876
267/292

(Continued)

FOREIGN PATENT DOCUMENTS

CN         205768590 U     12/2016
CN         109435659 A      3/2019
(Continued)

OTHER PUBLICATIONS

International Search Report issued on Apr. 3, 2023, in corresponding International Application No. PCT/EP2022/084494, 4 pages.
(Continued)

*Primary Examiner* — Ernesto A Suarez
*Assistant Examiner* — James J Taylor, II
(74) *Attorney, Agent, or Firm* — Maier & Maier, PLLC

(57) ABSTRACT

A drive device for an electrically operated vehicle axle of a two-track vehicle, with a drive unit in which an electric machine drives vehicle wheels via a gearbox. The electric machine is arranged transversely in the vehicle axle, and a stator housing of the electric machine is axially extended in the vehicle transverse direction with a gearbox housing. The drive unit is supported in a three-point bearing via three unit (Continued)

bearings in the vehicle body. The three-point bearing has two gearbox-side unit bearings via which the gearbox housing is supported in the vehicle body.

11 Claims, 4 Drawing Sheets

(51) Int. Cl.
  *F16H 37/08* (2006.01)
  *F16H 57/02* (2012.01)
  *F16H 57/021* (2012.01)
  *F16H 57/025* (2012.01)
  *F16H 57/028* (2012.01)
  *F16H 57/031* (2012.01)
  *F16H 57/037* (2012.01)

(52) U.S. Cl.
  CPC ......... *F16H 57/025* (2013.01); *F16H 57/031* (2013.01); *F16H 57/037* (2013.01); *B60K 2001/001* (2013.01); *F16H 2057/02034* (2013.01); *F16H 57/028* (2013.01)

(58) Field of Classification Search
  CPC . F16H 2057/02052; F16H 2057/02034; F16H 57/02; F16H 57/025; F16H 57/028; F16H 57/037; B62D 21/11; B62D 21/15
  See application file for complete search history.

(56) References Cited

U.S. PATENT DOCUMENTS 11,835,121 B2 * 12/2023 James ................ F16H 57/0423
2020/0262481 A1 8/2020 Yamada et al.

FOREIGN PATENT DOCUMENTS

| CN | 111873774 A | 11/2020 |
|---|---|---|
| DE | 69914973 T2 | 12/2004 |
| DE | 10021044 B4 | 2/2007 |
| DE | 102012012327 A1 | 12/2013 |
| DE | 102017220096 A1 | 5/2019 |
| EP | 1674316 B1 | 11/2009 |
| JP | 2012206582 A | 10/2012 |

OTHER PUBLICATIONS

Examination Report issued on Apr. 10, 2022, in corresponding German Application No. 10 2021 132 494.7, 10 pages.
International Preliminary Report on Patentability issued on Oct. 30, 2023, in corresponding International Application No. PCT/EP2022/084494, 12 pages.

* cited by examiner

DRIVE DEVICE FOR A VEHICLE AXLE

FIELD

The invention relates to a drive device for an electrically operated vehicle axle of a two-track vehicle.

BACKGROUND

An electrically operated vehicle axle for a two-track motor vehicle has an electric machine that drives via a gearbox on flange shafts, each of which leads to a vehicle wheel.

The electric machine and the gearbox are part of a drive unit that is supported via a three-point bearing or a four-point bearing, for example on a subframe of the vehicle body. The gearbox has a gear stage via which the electric machine is drivingly connected to an input side of an axle differential. On their output sides, the flange shafts lead in the direction of the respective vehicle wheel.

In a generic drive device, the electric machine is arranged axially parallel to the flange shafts. A stator housing of the electric machine is axially extended in the vehicle transverse direction with a gearbox housing in which the gear stage and the axle differential are arranged. The generic drive unit is supported in a three-point bearing via three unit bearings in the vehicle body. During driving, reaction forces are introduced from the vehicle wheels via the flange shafts into the axle differential and thus into the drive unit. In order to reliably support the moments of the reaction forces, the three-point bearing must be designed to be sufficiently rigid, space-intensive and use a lot of material. This can lead to installation space problems due to the high package density in the chassis.

From DE 10 2012 012 327 A1 an arrangement of an electric motor unit in the engine compartment of a motor vehicle is known. A vehicle with a fuel cell system mounted on it is known from DE 100 21 044 B4. A fastening structure for a drive motor is known from EP 1 674 316 B1. An arrangement for an electric drive unit is known from DE 699 14 973 T2.

SUMMARY

The object of the invention is to provide a drive device for an electrically operated vehicle axle of a two-track vehicle, in which the three-point bearing of the drive unit can be realized with reduced component requirement, reduced installation space requirement and reduced material requirements compared to the prior art.

The invention is based on a drive device of an electrically operated vehicle axle of a two-track vehicle. This has a drive unit in which an electric machine is connected via a gear stage to an input side of an axle differential. The axle differential drives in the transverse direction of the vehicle on both sides a flange shaft which leads to a vehicle wheel. When installed, the electric machine is mounted transversely in the vehicle axle, i.e. arranged parallel to the flange shafts. A stator housing of the electric machine is axially extended in the vehicle transverse direction with a gearbox housing in which the gear stage and the axle differential are arranged. The generic drive unit is supported in a three-point bearing via exactly three unit bearings in the vehicle body. During driving, reaction forces are transmitted from the road surface via the flange shafts to the axle differential and from there to the drive unit. The characterizing part of claim 1 relates to a torque support of these reaction forces, which can be realized with reduced component requirements, reduced installation space requirement and reduced material requirements compared to the prior art. For this purpose, the three-point bearing has two gearbox-side unit bearings, via which the gearbox housing is supported in the vehicle body. The two gearbox-side unit bearings are arranged on opposite sides in the vehicle's longitudinal direction with respect to the flange shaft axis, thereby providing torque support in both directions of flange shaft rotation.

In a technical implementation, the gearbox housing can be composed of a total of two housing parts, which are arranged axially one behind the other in the transverse direction of the vehicle. The two housing parts are an intermediate housing flanged to the stator housing and a housing cover that closes the interior of the gearbox housing. The housing cover and the intermediate housing each have a bearing wall. The bearing walls of the housing cover and of the intermediate housing are axially opposite each other in the transverse direction of the vehicle. In addition, the bearing walls each have bearing points for the gear shafts and for the flange shafts. To ensure stable rotary mounting of the gear shafts and the flange shafts, the housing cover and the intermediate housing are designed with appropriate component rigidity. In order to achieve a reliable support of the drive unit, it is preferred if a first gearbox-side unit bearing of the two gearbox-side unit bearings is formed on the housing cover, while the second gearbox-side unit bearing is formed on the intermediate housing. Both the housing cover and the intermediate housing can be provided as metal castings, on which the gearbox-side unit bearings are molded from the same material and in one piece.

To ensure perfect rotary support of the gear shafts and the flange shafts, the bearing walls of the housing cover and the intermediate housing are designed to be rigid using appropriate material. In a preferred embodiment, the first gearbox-side unit bearing can be located in a bearing wall plane of the housing cover, while the second gearbox-side unit bearing can be located in a bearing wall plane of the intermediate housing. In this way, the bearing walls of the housing cover and the intermediate housing have a double function of shearing plates in which reaction forces can be introduced without deformation during driving, thus achieving extremely rigid torque support for the component.

As a result of the design of the two unit bearings directly on the gearbox housing, there is a comparatively small transverse offset (lever arm length) relative to the axle differential when viewed in the transverse direction of the vehicle, which means that, for example, deflections or twisting of the drive unit due to introduced reaction forces can be easily prevented by design.

As mentioned above, the gearbox-side unit bearings according to the invention are components of a three-point bearing. In contrast to the two unit bearings on the gearbox side, a third unit bearing is formed directly on the stator housing in order to reliably support its component weight.

In a structurally simple embodiment variant, each of the unit bearings can be designed as a rubber-metal sleeve bearing that is pressed into a mounting eye of the gearbox housing and/or the stator housing. The mounting eye can be made of the same material and formed as a single piece on the gearbox housing or the stator housing. In order to achieve particularly effective torque support, it is preferred if the position axes of the two gearbox-side unit bearings and, in particular, of the stator housing-side unit bearing are aligned with their axes parallel to the flange shaft axis.

BRIEF DESCRIPTION OF THE FIGURES

An exemplary embodiment of the invention is described below by means of the appended figures.

In the figures.

DETAILED DESCRIPTION

Figure 1:
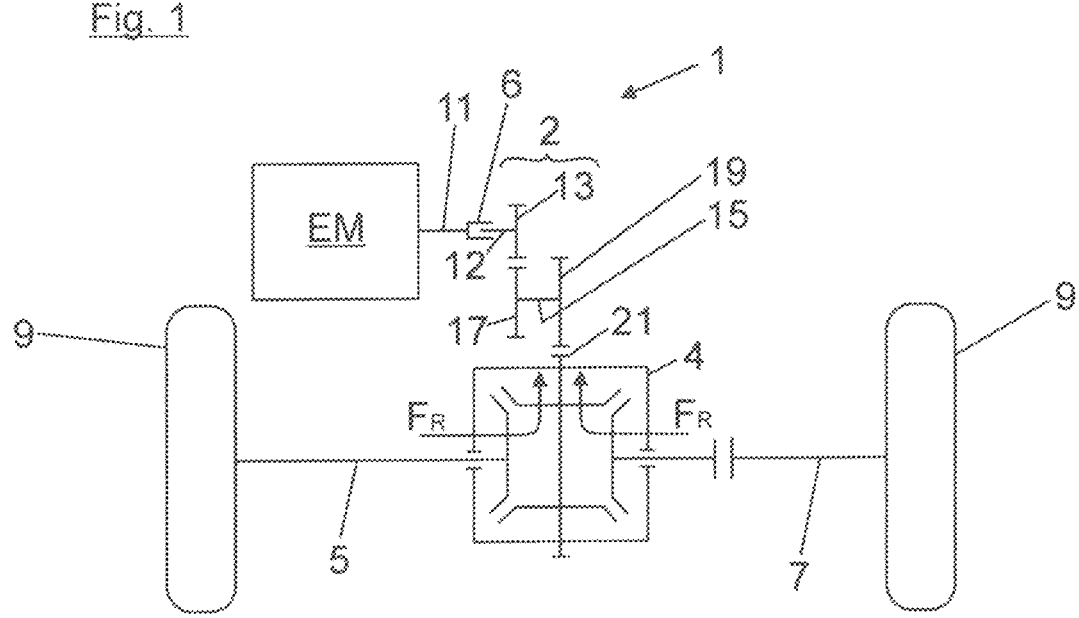
FIG. 1 shows a schematic representation of an electrically operated vehicle axle.

FIG. 1 shows an electrically operated vehicle axle the drive unit 1 of which has an electric machine EM and a gearbox. The electric machine EM is connected via a spur gear stage 2 and an axle differential 4 of the gearbox to right and left flange shafts 5, 7, which extend to vehicle wheels 9 of the vehicle axle. A rotor shaft 11 of the electric machine EM is coaxially connected to a gearbox input shaft 12 via an indicated torque coupling 6. A rotor 49 is mounted on the rotor shaft 11 in a rotationally fixed manner and interacts with a stator 51 arranged in a rotationally fixed manner on the stator housing 23.

A fixed gear 13, which is part of the spur gear stage 2, is located on the gearbox input shaft 12. The fixed gear 13 of the gearbox input shaft 12 meshes with a fixed gear 17 located on an intermediate shaft 15. A further fixed gear 19 is arranged on the intermediate shaft 15, which further fixed gear in turn meshes with an input-side external gear 21 of the axle differential 4. In FIG. 1, the electric machine EM is installed transversely, i.e. aligned axially parallel to the two flange shafts 5, 7.

Figure 2:
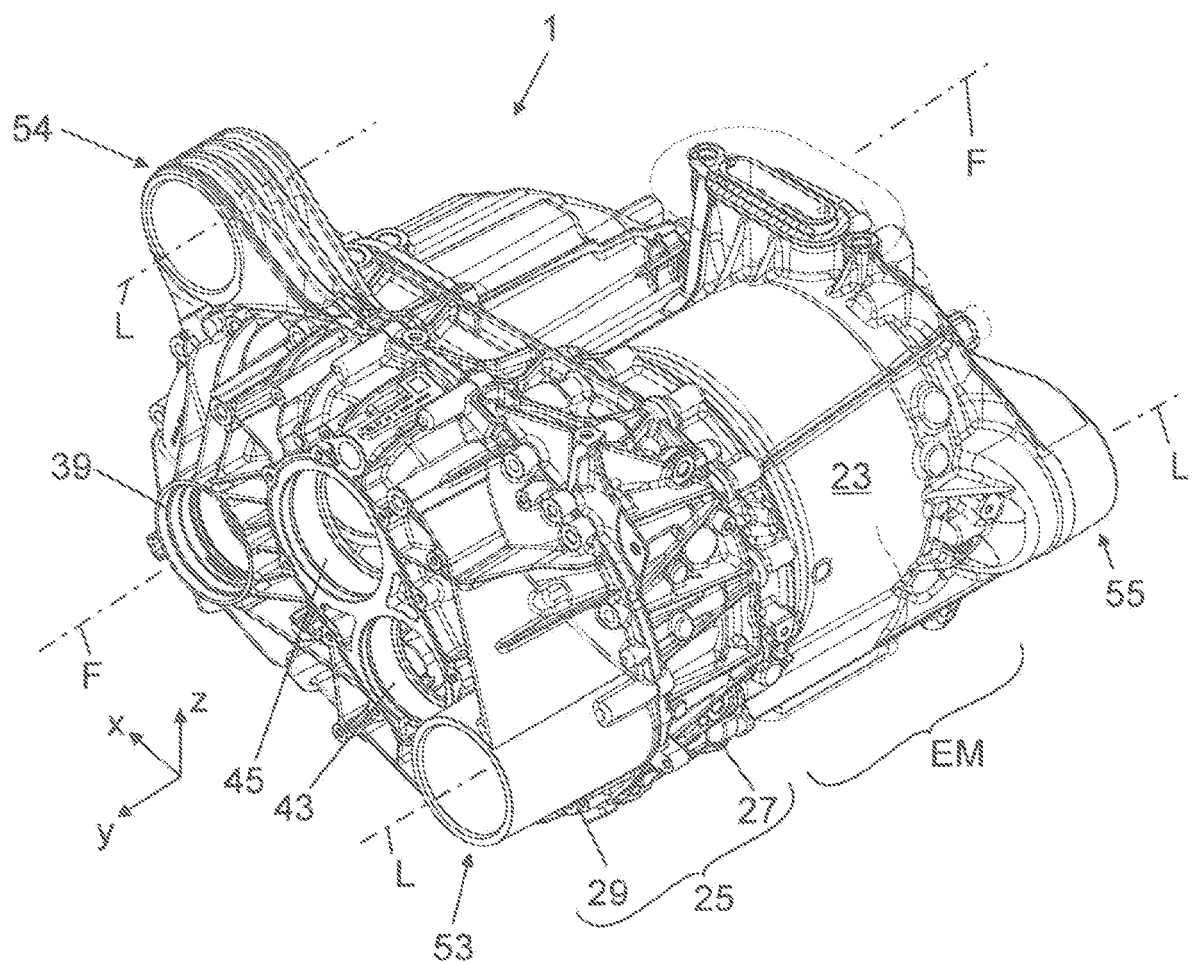
FIG. 2 shows a drive unit in a separate position.
Figure 3:
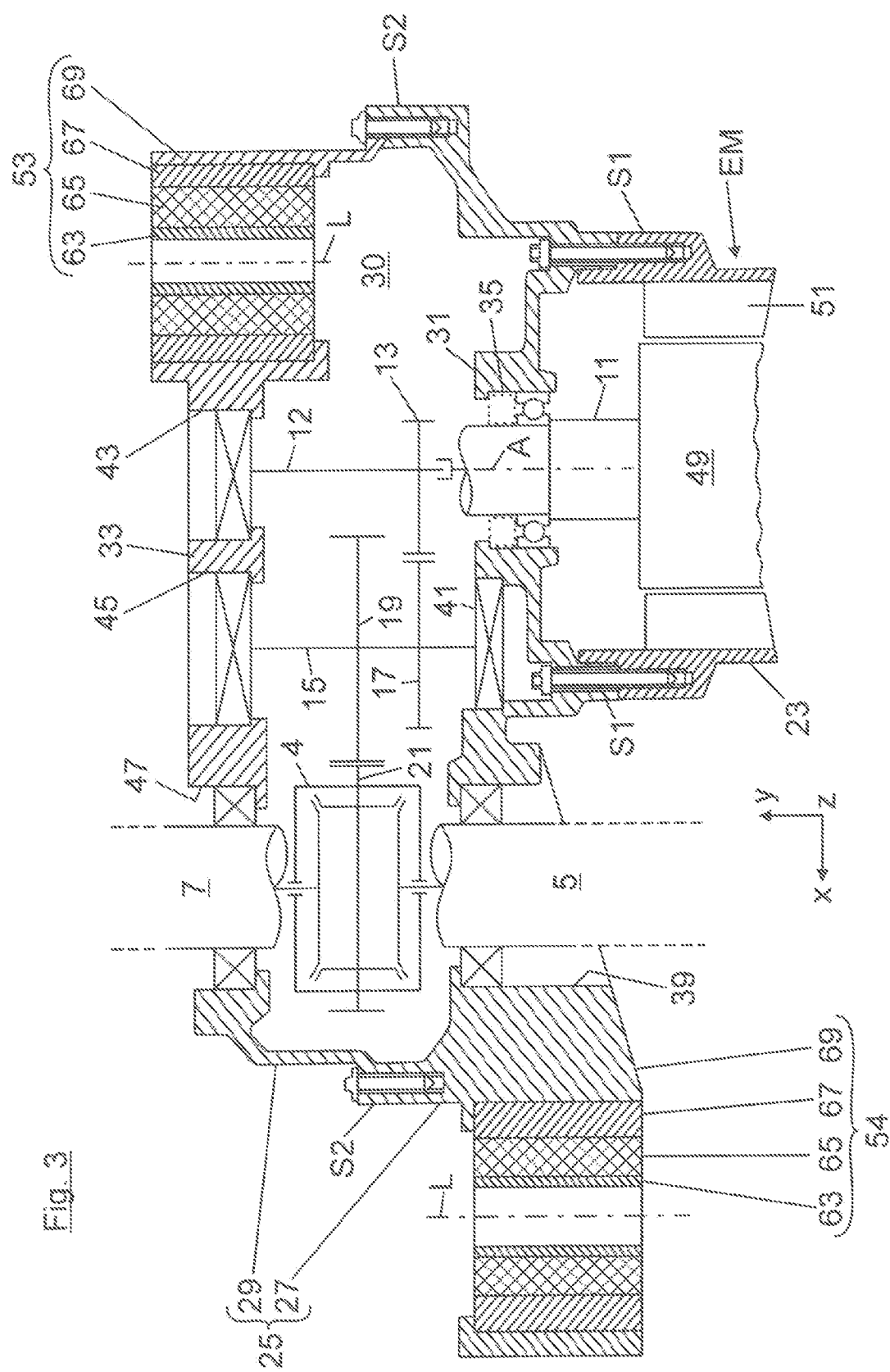
FIG. 3 shows a detailed view of a stator housing, an intermediate housing and a housing cover of the drive unit.

As can be further seen from FIGS. 2 and 3, the electric machine EM has a cylindrical stator housing 23 which is axially extended in the vehicle transverse direction y by a gearbox housing 25. Both the spur gear stage 2 and the axle differential 4 are arranged in the gearbox housing 25. The gearbox housing 25 is constructed in two parts in FIGS. 2 and 3, namely with an intermediate housing 27 and a housing cover 29. The intermediate housing 27 is flanged to the front of the stator housing 23 at first screw points S1 as shown in FIG. 3. In contrast, the housing cover 29 is flanged to the intermediate housing 27 via second screw points S2. The housing cover 29 closes the gearbox interior 30 in the axial direction (FIG. 3). In FIG. 3, the gearbox interior 30 is axially delimited in the vehicle transverse direction y by a bearing wall 31 of the intermediate housing 27 and by a bearing wall 33 of the housing cover 29. The bearing wall 31 of the intermediate housing 27 has a bearing opening 35 in which the rotor shaft 11 of the electric machine EM is rotatably mounted. In addition, the bearing wall 31 of the intermediate housing 27 has a shaft passage 39 in which the left flange shaft 5 is rotatably mounted. Furthermore, the bearing wall 31 of the intermediate housing 27 is formed with a pivot bearing point 41 for the intermediate shaft 15. The bearing wall 33 of the housing cover 29 has two bearing openings 43, 45 for the gearbox input shaft 12 and for the intermediate shaft 15 as well as a shaft passage 47 in which the right flange shaft 7 is rotatably mounted.

Figure 4:
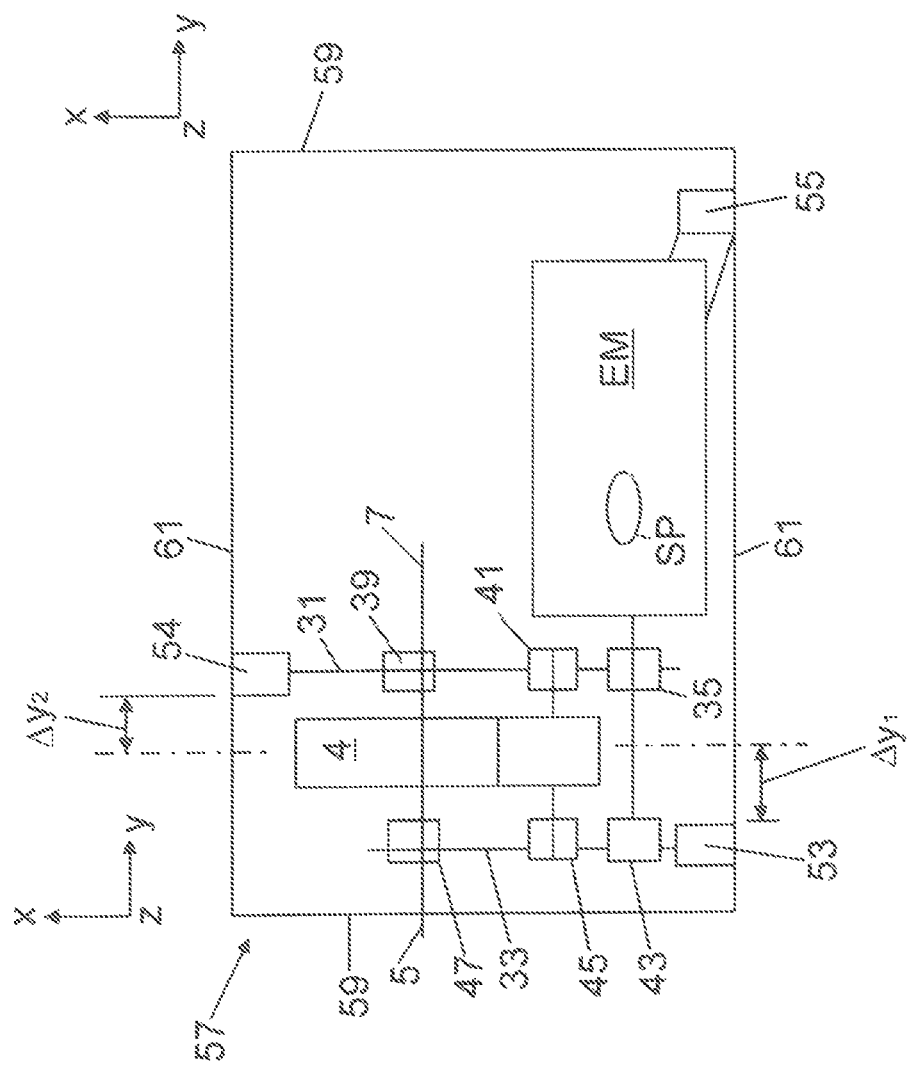
FIG. 4 shows a schematic equivalent diagram of the drive device.

FIG. 4 shows an installation position of the drive unit 1. Accordingly, the drive unit 1 is supported in a three-point bearing with a total of three unit bearings 53, 54, 55 on a roughly schematically indicated subframe 57. In FIG. 4, the subframe 57 has two lateral subframe longitudinal members 59, which are each connected to subframe cross members 61 at the front and rear of the vehicle.

The core of the invention concerns the design of the three-point bearing. This has two gearbox-side unit bearings 53, 54, via which the gearbox housing 25 is supported on the subframe 57. The two gearbox-side unit bearings 53, 54 are arranged on opposite sides, i.e. at the front and rear of the vehicle, with respect to the flange shaft axis F (FIG. 2) in the vehicle longitudinal direction x. By way of example, in FIG. 4 the first gearbox-side unit bearing 53 is connected to the rear subframe cross member 61, while the second gearbox-side unit bearing 54 is connected to the front subframe cross member 61. The third unit bearing 55, on the other hand, is arranged on the stator housing 23, which primarily supports the electric machine EM, in the region of which the center of gravity SP of the drive unit 1 is located.

During vehicle operation, reaction forces $F_R$ are introduced from the vehicle wheels 9 into the axle differential 4 via the flange shafts 5, 7 and from there to the rest of the drive unit 1. For a stable torque support of the reaction forces $F_R$, the two gearbox-side unit bearings 53, 54 are positioned with an extremely small transverse offset $\Delta y_1$, $\Delta y_2$ (FIG. 4) relative to the axle differential 4, when viewed in the vehicle transverse direction y.

The unit bearings 53, 54, 55 are each designed as rubber-metal sleeve bearings, as indicated in FIG. 3. Accordingly, each of the shown unit bearings 53, 54 has an inner, sleeve-shaped bearing core 63 which is connected to an outer sleeve 67 via an elastomer body 65. The radially inner bearing core 63 can be connected to bearing brackets of the subframe 57 via a bearing bolt (not shown). The bearing axes L of the two gearbox-side unit bearings 53, 54 as well as of the stator housing-side assembly bearing 55 are each aligned in the vehicle transverse direction y as shown in FIGS. 2 and 3.

As can be seen from FIG. 3 or 4, the first gearbox-side unit bearing 53 is formed on the housing cover 29. The first gearbox-side unit bearing 53 lies together with the bearing wall 33 of the housing cover 29 in a common plane. In the case of loading, the bearing wall 33 therefore acts as a component-rigid shearing plate. The second gearbox-side unit bearing 54 is formed analogously on the intermediate housing 27. The second gearbox-side unit bearing 54 lies together with the bearing wall 33 of the intermediate housing 27 in a common plane, whereby the bearing wall 33 of the intermediate housing 27 also acts as a component-rigid shearing plate in the event of a load.

LIST OF REFERENCE NUMERALS 1 drive unit
2 gearbox
3 spur gear stage
4 axle differential
5, 7 flange shafts
9 vehicle wheels
11 rotor shaft
12 gearbox input shaft
13 fixed gear
15 intermediate shaft
17 fixed gear
23 stator housing
25 gearbox housing
27 intermediate housing
29 housing cover
30 gearbox interior 31 bearing wall of the intermediate housing 27
33 bearing wall of the gearbox cover 29
35 bearing opening
39 shaft passage
41 pivot bearing
43, 45 bearing openings
47 shaft passage
49 rotor shaft
51 stator
53, 54, 55 unit bearing
57 subframe
59 subframe longitudinal member
61 subframe cross member
63 inner bearing core
65 elastomer body
67 outer sleeve
S1, S2 screw points
L bearing axes
F flange shaft axis
$\Delta y_1, \Delta y_2$ transverse offset
$F_R$ reaction forces

The invention claimed is:

1. A drive unit for an electrically operated vehicle axle of a two-track vehicle, the drive unit comprising an electric machine that drives vehicle wheels via a gearbox, the gearbox comprising a gear stage and an axle differential, wherein:
the electric machine is arranged transversely in the vehicle axle;
a stator housing of the electric machine is axially extended in a vehicle transverse direction with a gearbox housing;
the drive unit is supported in a three-point bearing via three unit bearings in a vehicle body of the vehicle, wherein, for a torque support of reaction forces, the three unit bearings of the three-point bearing include two gearbox-side unit bearings, via which the gearbox housing is supported in the vehicle body;
the gearbox housing is composed of two housing parts which are arranged axially one behind the other in the vehicle transverse direction, the two housing parts being an intermediate housing flanged to the stator housing and a housing cover which closes the gearbox housing interior, wherein the housing cover and the intermediate housing each have bearing walls which are axially opposite one another, wherein gearbox shafts and flange shafts are rotatably mounted in the bearing walls of the housing cover and the intermediate housing;
a first gearbox-side unit bearing of the two gearbox-side unit bearings is formed on the housing cover, and a second gearbox-side unit bearing of the two gearbox-side unit bearings is formed on the intermediate housing;
each of the three unit bearings is designed as a rubber-metal sleeve bearing which is pressed into a mounting eye of the gearbox housing or the stator housing;
the first gearbox-side unit bearing lies in a bearing wall plane of the housing cover; and
the second gearbox-side unit bearing lies in a bearing wall plane of the intermediate housing.

2. The drive unit according to claim 1, wherein:
the electric machine is drivingly connected via the gear stage to an input side of the axle differential which drives, on both sides thereof in the vehicle transverse direction, the flange shafts, each of which leads to a respective vehicle wheel of the vehicle wheels;
the electric machine is arranged axially parallel to the flange shafts;
the gear stage and the axle differential are arranged in the gearbox housing; and
during driving operation, the flange shafts introduce reaction forces into the drive unit via the axle differential.

3. The drive unit according to claim 2, wherein, due to the design on the gearbox housing, each of the first and second gearbox-side unit bearings are positioned with a transverse offset relative to the axle differential, viewed in the vehicle transverse direction.

4. The drive unit according to claim 2, wherein a third unit bearing of the three unit bearings is formed on the stator housing.

5. The drive unit according to claim 2, wherein bearing axes of the first and second gearbox-side unit bearings and a stator housing-side unit bearing of the three unit bearings are aligned axially parallel to a flange shaft axis.

6. The drive unit according to claim 1, wherein, due to the design on the gearbox housing, each of the first and second gearbox-side unit bearings are positioned with a transverse offset relative to the axle differential, viewed in the vehicle transverse direction.

7. The drive unit according to claim 6, wherein a third unit bearing of the three unit bearings is formed on the stator housing.

8. The drive unit according to claim 6, wherein bearing axes of the first and second gearbox-side unit bearings and a stator housing-side unit bearing of the three unit bearings are aligned axially parallel to a flange shaft axis.

9. The drive unit according to claim 1, wherein a third unit bearing of the three unit bearings is formed on the stator housing.

10. The drive unit according to claim 9, wherein bearing axes of the first and second gearbox-side unit bearings and the third unit bearing, which serves as a stator housing-side unit bearing, of the three unit bearings are aligned axially parallel to a flange shaft axis.

11. The drive unit according to claim 1, wherein bearing axes of the first and second gearbox-side unit bearings and a stator housing-side unit bearing of the three unit bearings are aligned axially parallel to a flange shaft axis.

* * * * *